United States Patent [19]

Qualich et al.

[11] Patent Number: 5,481,175
[45] Date of Patent: Jan. 2, 1996

[54] SYSTEM AND METHOD FOR CHARGING AUXILIARY BATTERIES

[75] Inventors: John Qualich, Buffalo Grove; Cary Chmielewski, Prospect Heights; Kirk Sievers, Roselle, all of Ill.

[73] Assignee: Motorola, Inc., Schaumburg, Ill.

[21] Appl. No.: 169,284

[22] Filed: Dec. 20, 1993

[51] Int. Cl.$^6$ .................................................. H01M 10/46
[52] U.S. Cl. .................................................. 320/15; 320/40
[58] Field of Search ................................ 320/5, 6, 7, 15, 320/16, 17, 18, 39, 40

[56] References Cited

U.S. PATENT DOCUMENTS

| | | | |
|---|---|---|---|
| 3,671,843 | 6/1972 | Huntzinger et al. | 320/15 |
| 3,900,184 | 8/1975 | Seike | 320/6 |
| 4,044,293 | 8/1977 | Follmer | 320/15 |
| 4,644,247 | 2/1987 | Burmenko | 320/39 |
| 4,672,294 | 6/1987 | Norton | 320/17 |
| 5,225,761 | 7/1993 | Albright | 320/15 |
| 5,260,637 | 11/1993 | Pizzi | 320/6 |

FOREIGN PATENT DOCUMENTS

| | | |
|---|---|---|
| WO8700490 | 1/1987 | WIPO . |
| WO92114631 | 9/1992 | WIPO . |

*Primary Examiner*—Jeffrey L. Sterrett
*Assistant Examiner*—Edward Tso
*Attorney, Agent, or Firm*—Nicholas C. Hopman

[57] ABSTRACT

A system and method for charging an auxiliary battery (107) that drives an auxiliary load (109) includes a regulator (111', 223) coupled to an auxiliary battery (107). The regulator (111', 223) provides a charge current (121') that is variable dependent on a parameter of a control signal (203). Preferably, the parameter is an amplitude. A switch (113') provides a coupling and a decoupling between the auxiliary battery (107) and the auxiliary load (109). A control device (115') decouples the auxiliary battery (107) from the auxiliary load (109) via the switch (113'), and then provides the control signal (203) to the regulator (111', 223). By effecting this action, the regulator (111', 223) provides the variable charge current (121') to the auxiliary battery (107) dependent on the amplitude of the control signal (203).

26 Claims, 3 Drawing Sheets

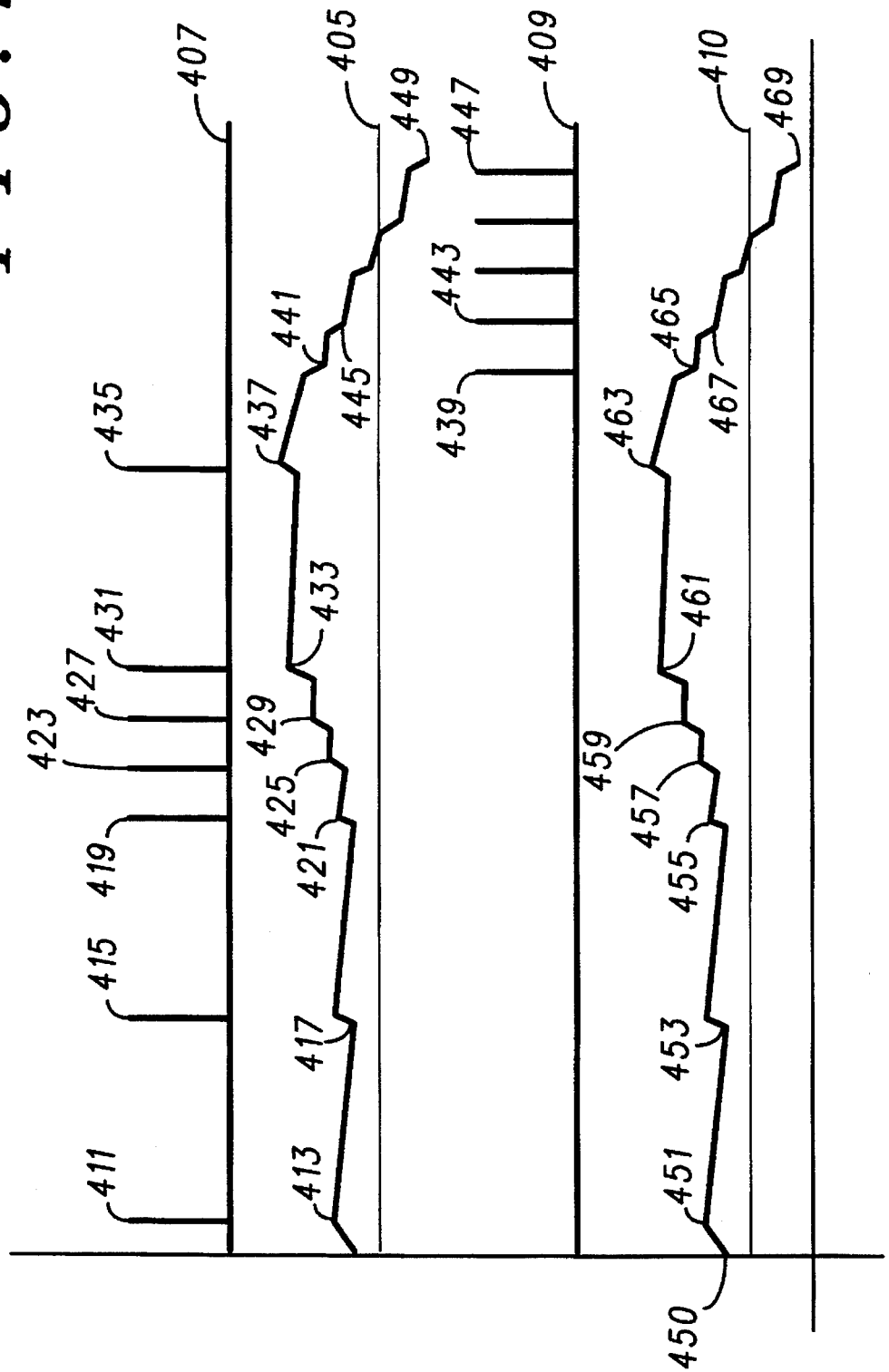

SYSTEM AND METHOD FOR CHARGING AUXILIARY BATTERIES

FIELD OF THE INVENTION

This invention is generally directed to the field of battery chargers. In particular, it is useful for charging an auxiliary battery in a vehicle that has an auxiliary load powered by the auxiliary battery.

BACKGROUND OF THE INVENTION

Vehicle systems are evolving to meet stricter emissions requirements. Catalytic converters are often employed to help meet these requirements. When operating optimally, a catalytic converter exchanges pollutants including hydrocarbons, carbon monoxide and oxides of nitrogen in the exhausted gas stream to water, carbon dioxide and nitrogen. The catalyst is quite efficient when it is at high temperatures.

One requirement many systems designers are faced with, is how to reduce emissions produced by an internal combustion engine from a cold start condition. When the vehicle is first started after a long inactive period, the catalytic converter is cold and is not effective in removing the excess pollutants from the exhausted gas stream.

To counteract this undesirable result, system designers are turning to approaches that electrically pre-heat the catalytic converter when the vehicle is first started. Since a great deal of energy, typically 125 kJ, is required to pre-heat a typical catalytic converter within the thirty seconds desired, often an auxiliary battery, not the vehicle's main battery, is employed to provide the required energy.

Because batteries only temporarily store energy, after depletion by the catalytic converter pre-heating sequence, the auxiliary battery often needs charging to restore the depleted energy. This charging requirement presents a rather difficult problem to a system supporting it. This is because of the inefficiency associated with charging the auxiliary battery.

FIG. 1 shows a system block diagram of a prior art implementation of a control system for charging auxiliary batteries. In a vehicular application, a charging system 101 typically consists of an alternator driven by a reciprocating engine. This charging system 101, is connected to a primary vehicle battery 103 for the purpose of restoring charge depleted from the primary vehicle battery 103 during normal service by a main load 105. The main load 105 may consist of a starter motor, and other electrical appliances associated with modem vehicles. An auxiliary battery recharge switch 111 is connected between the charging system 101 and an auxiliary battery 107. An auxiliary load enable switch 113 is connected between the auxiliary battery 107 and an auxiliary load 109. The auxiliary load 109 in this instance is an electrical heater for a catalytic converter. The auxiliary battery recharge switch 111 and the auxiliary load enable switch 113 are operated by a control device 115. Generally, the switches 111 and 113 are activated exclusively when the vehicle is operating.

Operation of the system is as follows. When a vehicle having this system is initially turned on, the control device 115 disconnects the auxiliary battery 107 from the charging system 101 by opening the auxiliary battery recharge switch 111 via control line 117. Also, the control device 115 closes the auxiliary load enable switch 113 via control line 119. Closing the auxiliary load enable switch 113 connects the auxiliary battery 107 to the auxiliary load 109. When this occurs the auxiliary load 109, in this case an electrical heater for a catalytic converter, is activated and thereby partially discharges the auxiliary battery 107 via a discharge current 123 while the heater dissipates heat. When a pre-heat period is finished, the control device 115 will open the auxiliary load enable switch 113, thereby disconnecting the auxiliary battery 107 from the auxiliary load 109 and interrupting the discharge current 123.

At this juncture the vehicle has started operating and its reciprocating engine is driving the charging system 101. Also, the main battery 103 is being charged by the charging system 101. The control device 115 then closes the auxiliary battery recharge switch 111 via control line 117 thereby creating a charge current 121 for recharging the auxiliary battery 107. When the auxiliary battery recharge switch 111 is initially closed, the auxiliary battery 107 will have a lower terminal voltage across it than the charging system 101. Because both the auxiliary battery 107 and the charging system 101 have relatively low terminal resistance, the voltage across the auxiliary battery recharge switch 111 is dependent on these terminal voltages. If the auxiliary battery 107 is substantially depleted, then the voltage across the auxiliary battery recharge switch 111 can be substantial. Because the auxiliary battery recharge switch 111 has some finite resistance, when the charge current 121 is active, the auxiliary battery recharge switch 111 will have a relatively high power dissipation. For instance, if the auxiliary battery recharge switch 111 has a resistance of 30 milliohms, and the current of the charge current 121 is typically about 50 amps the power dissipated by the auxiliary battery recharge switch 111 will be about 75 watts. Providing a switch for dissipating 75 watts in a vehicular environment is not only costly but because the operating temperature environment often exceeds 85 degrees Celsius it is difficult to design a reliable, long lived switch device to function as the auxiliary battery recharge switch 111. Further, since the power dissipation of the auxiliary battery recharge switch 111 will vary dependent on the voltage across the auxiliary battery recharge switch 111, the charge current 121 must be limited by the maximum power dissipation of the auxiliary battery recharge switch 111. This means that, pursuant to the protection of the auxiliary battery recharge switch 111, only a fixed charge current 121 will be used to charge the auxiliary battery 107. Because of this fixed charge current 121, the auxiliary battery 107 will take a relatively long time to charge.

A further defect in prior art systems is that when the charging system 101 is heavily loaded there is no facility to impede the addition of further loading associated with recharging the auxiliary battery 107.

What is needed is an improved control system for charging an auxiliary battery in a multiple battery system, that is not only more efficient but more reliable than prior art schemes.

BRIEF DESCRIPTION OF THE DRAWINGS

FIG. 4 is a graph illustrating various control signals and a resulting charge current for charging an auxiliary battery in accordance with the preferred embodiment of the invention.

DETAILED DESCRIPTION OF A PREFERRED EMBODIMENT

A system and method for charging an auxiliary battery that drives an auxiliary load includes a regulator coupled to an auxiliary battery. The regulator provides a charge current that is variable dependent on a parameter of a control signal. Preferably, the parameter is an amplitude. A switch provides a coupling and a decoupling between the auxiliary battery and the auxiliary load. A control device decouples the auxiliary battery from the auxiliary load via the switch, and then provides the control signal to the regulator. By effecting this action the regulator provides the variable charge current to the auxiliary battery dependent on the amplitude of the control signal. Contrary to the prior art approach, the charge current will be maximized within the allowable safe operating area of the regulator. Since the charge current can now be increased as the voltage across the regulator decreases, the auxiliary battery will charge faster than in the prior art approach. Details of a preferred embodiment will be better understood by referring to FIGS. 2 and 3.

Figure 1:
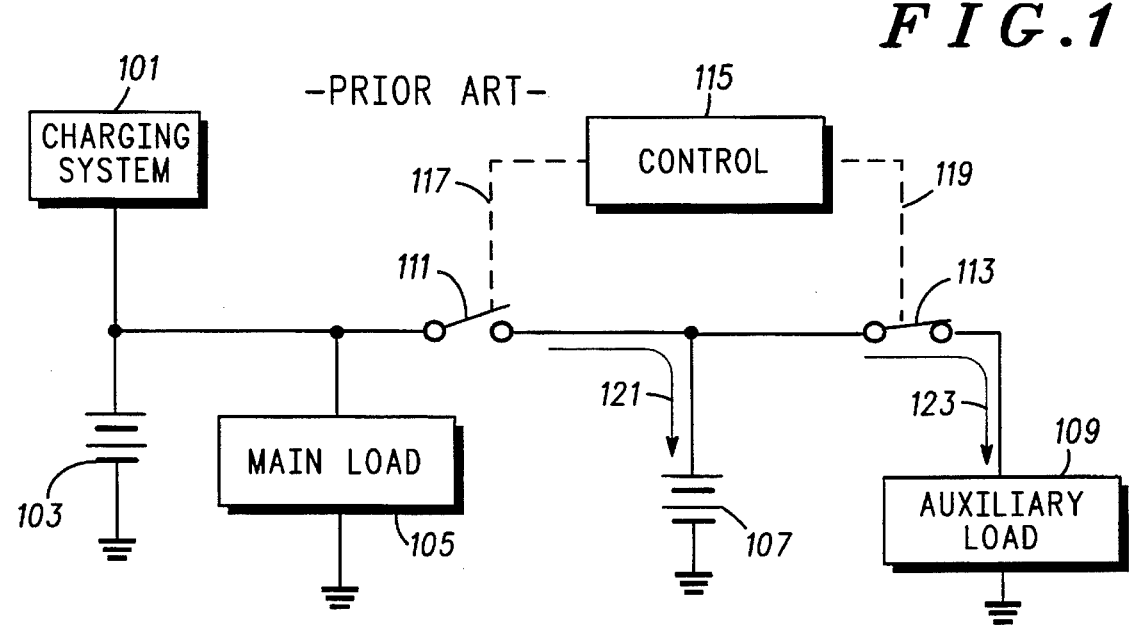
FIG. 1 is a system block diagram illustrating details of a prior art charging system.
Figure 3:
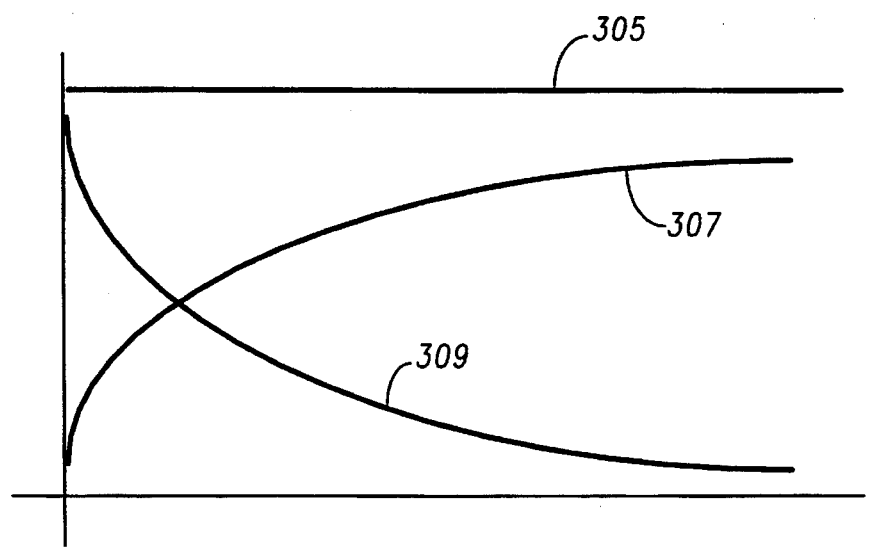
FIG. 3 is a graph showing relationships of various system parameters that the improved control system controls.
Figure 2:
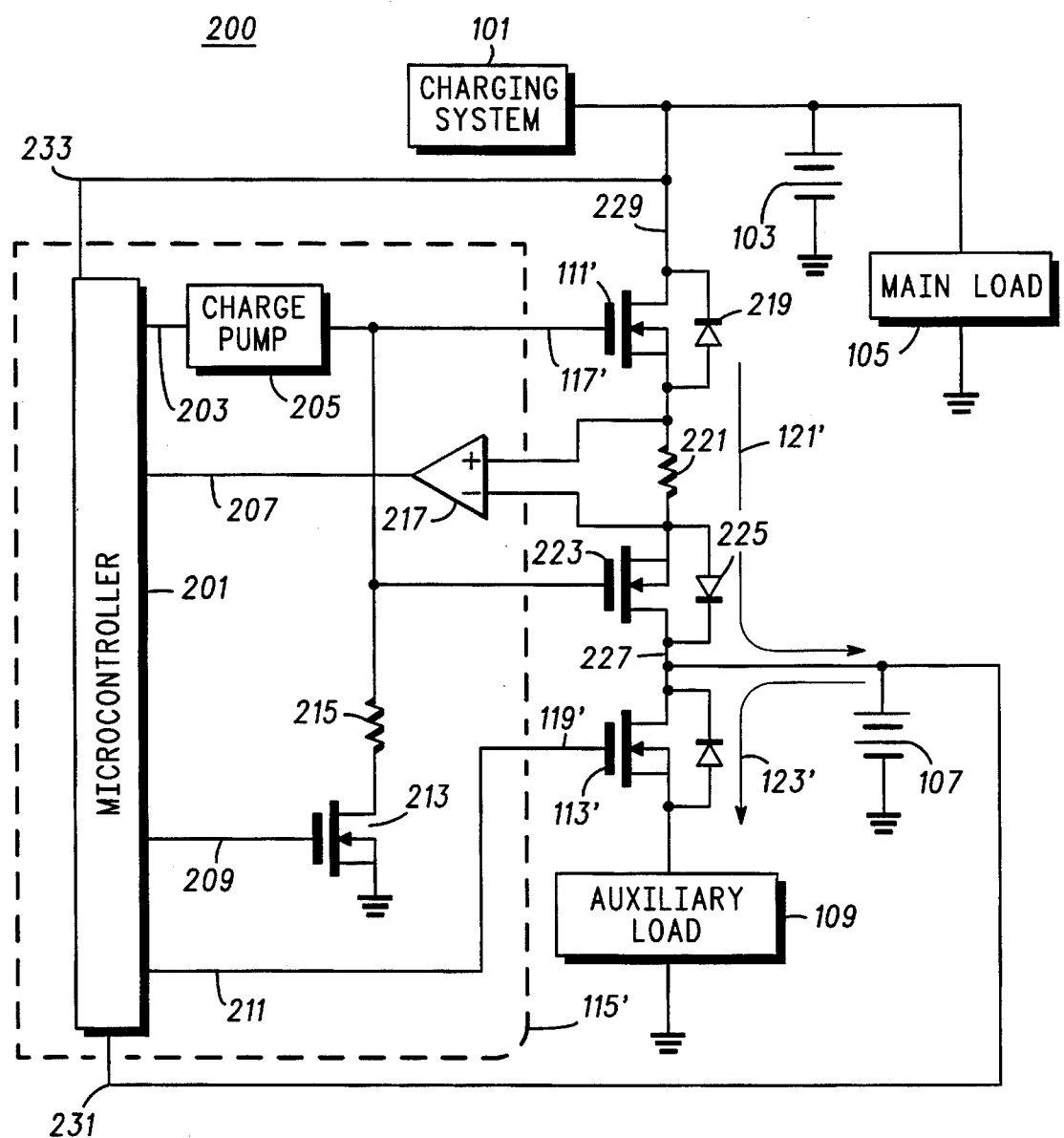
FIG. 2 shows an improved control system for charging an auxiliary battery in a two battery system in accordance with a preferred embodiment of the invention.

FIG. 2 shows an improved system for charging an auxiliary battery in a two battery system. FIG. 3 is a graph showing relationships of various system parameters. The goal of the system shown in FIG. 2 is to effectively manage power dissipation in a circuit that emulates the auxiliary battery recharge switch 111 function introduced in FIG. 1. Here a first transistor, or FET, 111' forms the auxiliary battery recharge switch 111 function from FIG. 1. For this discussion elements 221, 223, and 225 do not play a significant role, and are assumed not to be in the circuit. Later their significance will be considered.

As mentioned in the Background section and reviewed briefly here, the voltage across the auxiliary battery recharge switch 111 of FIG. 1, is dependent on the terminal voltages measured across the charging system 101 and the auxiliary battery 107. Here this corresponds to terminal voltages present at the reference numbers 227 and 229. When the auxiliary battery recharge switch 111, here the FET 111' is initially closed, or activated, the terminal voltage 227 associated with the auxiliary battery 107 will be lower than the terminal voltage 229 associated with the charging system 101. If the auxiliary battery 107 is substantially depleted, then the voltage across the FET 111' can be substantial. Because the FET 111' has some finite resistance—here defined by its channel resistance, when the charge current 121, here 121' is active, the FET 111' will have a relatively high power dissipation. The power dissipation is determined by the voltage across the FET and the FET's channel resistance. As the auxiliary battery 107 takes on charge, the terminal voltage 227 across the auxiliary battery 107 will rise towards the terminal voltage 229 across the charging system 101. This action will reduce the voltage across the FET 111'. Referring to FIG. 3 this declining voltage is represented by the curve labeled 309. Preferably, power dissipation is managed at a constant level as the voltage across the FET 111' varies. This constant power dissipation is shown by the constant curve labeled 305 in FIG. 3. An advantage of this approach is that the charge current 121' provided by the charging system 101 for charging the auxiliary battery 107, may be increased as the voltage across the FET 111' decreases. This trend of charge current 121' is represented in FIG. 3 using curve 307. This variable charge current 121' approach allows faster recharging of the auxiliary battery 107 while protecting the auxiliary battery recharge switch 111 from over dissipation. With prior art approaches the charge current 121' was not increased when possible and thus earlier approaches inefficiently charged the auxiliary battery 107.

In the apparatus shown in FIG. 2 the FET's 111' channel resistance is controlled dependent on the voltage across the FET 111'. The channel resistance is reduced as the voltage across the FET 111' is decreased, thereby allowing more charge current 121' flow between the charging system 101 and the auxiliary battery 107.

The actual charge current 121' is representable using the following deterministic relationship.

$$I_{charge} = \frac{(V_{ch} - V_{ab})}{R_{ds_{on}}} \qquad \text{EQUATION 1}$$

where:
- $I_{charge}$=auxiliary battery 107 charge current 121'
- $V_{ch}$=terminal voltage 229 measured across the charging system 101
- $V_{ab}$=terminal voltage 227 measured across the auxiliary battery 107
- $R_{ds_{on}}$=channel resistance of auxiliary battery recharge switch, (FET 111')

In FIG. 2 the reverse oriented FET 223 is applied in the circuit 200 to provide reverse battery protection and to prevent leakage currents from being conducted from the auxiliary battery 107 to amplifier 217 when a vehicle having this circuit 200 is turned off. This is a common requirement in vehicular applications. Specifically, if the main battery 103 is installed backwards, thereby reversing the polarity of the battery's terminals, the intrinsic diode 225 of the reverse oriented FET 223 will prevent current from flowing through the intrinsic diode 219 of FET 111'. Also, the intrinsic diode 225 of the reverse oriented FET 223 will prevent current from depleting the auxiliary battery 107 when the circuit 200 is off.

Operation of the system is described next. Note that a combination of FETs 111' and 223 in series represent the auxiliary battery recharge switch 111 of FIG. 1. Also note that the control line 117 of FIG. 1 is represented here by reference number 117'.

For the following discussion the auxiliary load enable switch 113, here FET 113' is shut off via a command signal 211 provided by a microcontroller 201 on a control line 119'. Therefore, the auxiliary load, here a heater element of a catalytic converter 109 is not activated and thereby draws no discharge current 123'. Note that the microcontroller used here is a Motorola MC68HC05B5. Of course, other equivalent microcontrollers, or apparatus may substituted for this microcontroller 201.

Essentially, when demanded, the current provided through the FETs 111' and 223 to charge the auxiliary battery 107 is controlled via the relationship illustrated in FIG. 3 and described by EQUATION 1. The conduction—thus $R_{dson}$ of the FET's 111' and 223 is varied by controlling a voltage between the FETs gate and source terminal. This can be accomplished by applying a variable amplitude voltage between the FETs gate to source terminal. In this case the charge current 121' will be variable dependent on an amplitude of a control signal. Alternatively, another parameter of the control signal may be used due to characteristics of the FETs 111' and 223. Specifically a variable frequency control signal 203 will be used to control the voltage between the FETs gate and source terminal—thus conduction—thus $R_{dson}$ of the two FETs 111' and 223—thus the charge current 121'.

The microcontroller 201 controls the amount of conduction of FETs 111' and 223, which form a power dissipating pass element of the current regulator, by either adding charge to the gate of the FETs 111' and 223 by pulsing a charge pump circuit 205 via signal 203, or by depleting charge from the gate of FETs 111' and 223 using a charge sink circuit comprised of a resistor 215 and a FET 213 which is pulsed via a control signal 209.

Conveniently, FETs 111' and 223 have an intrinsic gate to source terminal capacitance. Because of this, the gates of these FETs 111' and 223 can be charged by a transient current pulse, and the intrinsic gate to source terminal capacitance will hold the charge until it is discharged through a leakage path or by other means. To minimize the combined channel resistance, or $R_{dson}$ of the two FETs 111' and 223, the FETs will be charged to a relatively high gate to source terminal voltage. The charge pump circuit 205 elevates the voltage of the pulses of the control signal 203 provided by the microcontroller 201 and provides these pulses on the control line 117' to the gates of FETs 111' and 223.

Concurrent with the provision of the pulses via the control signal 203, the microcontroller 201 monitors a proportional current signal 207, provided by an amplifier 217. This proportional current signal 207 is proportional to the charge current 121' traveling through a current sense resistor 221. The microcontroller 201 will also sense the voltage across the FETs 111' and 223 by measuring the terminal voltages 227 and 229 via inputs 231 and 233 respectively. Method steps, in the form of software executing internal to the microcontroller 201, ensure the power regulation curve shown by reference number 305 in FIG. 3.

FIG. 4 is a graph illustrating various control signals an a resulting charge current for charging the auxiliary battery 107. A waveform 407 represents the control signal 203 which is used to add charge to the FETs 111' and 223. Another waveform 409 represents the control signal 209 that is used to deplete charge to FETs 111' and 223. And a waveform shown on reference line 405, dependent on waveforms 407 and 409, represents the voltage provided on the control line 117' to the gates of the FETs 111' and 223. The earlier mentioned intrinsic gate to source capacitance of the gates of FETs 111' and 223 cause the integrated behavior of the waveform shown on reference line 405 and 410. Also, a waveform illustrated on reference line 410 shows the charge current 121' that depends on the voltage provided on the control line 117' to the gates of the FETs 111' and 223. The microcontroller 201 will regulate the charge current 121' to the level shown here dependent on the terminal voltage across the FETs 111' and 223.

At reference number 450, the charge current 121' starts out at a certain level. If the auxiliary battery recharge switch 111 (here FETs 111' and 223) is closed, the microcontroller will continuously monitor the difference between the terminal voltages 227 and 229 via inputs 231 and 233 respectively. If according to an internal model of the FETs 111' and 223, said model based on the curves in FIG. 3, the charge current 121' can be increased, because the voltage difference between the terminal voltages 227 and 229 is sufficiently low to allow conduction of additional current while maintaining constant power per curve 305, then the microcontroller 201 will output a pulse on the line associated with the control signal 203. This control signal in turn activates the charge pump circuit 205 which in turn charges the gates of FETs 111' and 223. This will increase the magnitude of gate charge, here shown as a voltage dependent on the actual charge, shown on the control line 117', to the level indicated by reference 413. This increase in gate charge will increase the conduction of FETs 111' and 223, thus decreasing the $R_{dson}$ of the two FETs 111' and 223, thereby increasing charge current 121' to a level indicated by reference 451.

As mentioned earlier, the microcontroller 201 continuously monitors the proportional current signal 207, provided by an amplifier 217. This proportional current signal 207 is proportional to the charge current 121' traveling through the current sense resistor 221. Since the intrinsic gate capacitance of the FETs 111' and 223 have a certain leakage, the gate charge will drop as the charge on the gate capacitance is depleted via this leakage. Because the conduction of the FETs 111' and 223 are dependent on this charge on the gate, as the charge is depleted the FETs 111' and 223 will conduct less and thus have a higher $R_{dson}$. Because of this, the charge current 121' shown here in the waveform associated with reference line 410, will decrease. As a result the proportional current signal 207 will decrease.

Since the microcontroller 201 is attempting to maintain the charge current 121' at a constant regulated level, the microcontroller 201 will output another pulse 415 on the line associated with the control signal 203. This will again increase the magnitude of gate charge on control line 117' to the level indicated by reference number 417. Also, this action will again increase the magnitude of gate charge, shown on the control line 117', to the level indicated by reference 417. Also, since the FETs 111' and 223 will now conduct more, the charge current 121' will again increase as shown by reference number 453.

This process repeats itself at reference numbers 419, 421, and 455.

As this process continues and the auxiliary battery becomes more-and-more charged, the terminal voltage 227 across the auxiliary battery more closely approaches the terminal voltage 229 across the charging system. As noted earlier the power dissipation of the FET's 111' and 223 is dependent on these voltages. As mentioned earlier this allows the charge current 121' to be increased while maintaining a constant power dissipated 305 by the FETs 111' and 223.

Three additional pulses 423, 427, and 431, and resulting waveform perturbations 425, 429, 433, and 457, 459, 461 illustrate the higher gate charge, and higher average charge current 121'.

The above sequence is continued whenever it is desirable to increase charge current 121'. The rate, or frequency of the pulses provided in the control signal 203 determines the charging of the gates of FETs 111' and 223, thus the charge current 121'.

Charge current 121' can be lowered by decreasing the frequency of the control signal's pulses as shown by reference numbers 435, 437, and 463. Alternatively, the charge current 121' can be lowered much faster by depleting charge from the gates of FETs 111' and 223 through a resistor 215 by pulsing a FET 213 via the control signal 209.

At reference number 439, a pulse is output from the microcontroller 201 via control signal 209. This causes the FET 213 to conduct for the duration of the pulse 439. Some of the gate charge shown on control line 117' will be discharged through FET 213 and resistor 215 during that time. The voltage shown on control line 117' will decay to as shown at reference 441, and the charge current 121' will decay to the level at reference 465.

This sequence is repeated as shown by reference numbers 443, 445, and 467 respectively, and 447, 449, and 469 respectively. Each time this sequence occurs the charge current 121' will be lowered.

Another aspect of the preferred embodiment is that of not loading the charging system 101 with a significant charge current 121', when the main load 105 is significantly loading the charging system 101. Specifically, should the charging system 101 be excessively loaded by the main load 105, as indicated by a low terminal voltage 229, the charge current 121' will be reduced via the current regulator components 111' and 223 as follows. The microcontroller 201 will monitor the charging system voltage 229 via signal 233. Should terminal voltage be determined to be too low, the microcontroller 201 will reduce the amount of conduction of FETs 111' and 223 by causing a lower voltage to be provided to control line 117' by pulsing transistor 213 through signal 209. The intent is to prevent excessive reduction in voltage available to the main load 105 at the time the auxiliary battery 107 is being charged by charge current 121'.

Although a particular system has been described above, other forms of apparatus and/or methods may be devised without departing from the essential teaching of this disclosure that perform the equivalent function.

In conclusion, this system, and associated method will allow control of the charge current 121' in such a way as to actively limit the power dissipation of the FETs 111' and 223. This is accomplished by anticipating the power dissipated by measuring a portion of the charge current 121' and the terminal voltage 229 and 227 across the FETs 111' and 223, and varying the FETs' conduction dependent on interpretation of these variables. This approach allows faster charging of the auxiliary battery 107, because as the auxiliary battery accepts charge and its terminal voltage 229 approaches the terminal voltage of the charging system 227, the charging current 121' can be increased within the limits of the FET's 111' and 223 power dissipation.

Although the preferred embodiment shows the use of pulses repetitively charging and discharging an intrinsic gate capacitance in the FETs 111' and 223, other drive methods such as a direct amplitude control of the FETs 111' and 223 can be used. Additionally, the disclosed structure provides for protection against reverse battery installation. Specifically, the intrinsic diode 225 of the reverse oriented FET 223 is arranged to conduct the variable charge current (121'), and to block, or prevent, current from depleting the auxiliary battery 107 when the circuit 200 is off.

Further, the system has facility to restrict excessive loading of the charging system 101 by controlling the recharging the auxiliary battery 107 in accordance with a measure of the loading of the charging system 101. As mentioned above, this is accomplished by determining the loading of the charging system, dependent on the amplitude of the terminal voltage 229 prior to connecting the auxiliary load to the charging system 101. This offers a significant advantage over prior art approaches that did not account for this excessive loading.

What is claimed is:

1. A system for charging an auxiliary battery that drives an auxiliary load, said system comprising:

a regulator for providing a charge current to said auxiliary battery, wherein the charge current is variable dependent on a parameter of a control signal; and a control device for decoupling said auxiliary battery from said auxiliary load, and then providing the parameter of the control signal to said regulator dependent on a voltage across the regulator.

2. A system in accordance with claim 1 wherein the parameter of the control signal is an amplitude of the control signal.

3. A system in accordance with claim 1 wherein the parameter of the control signal is a frequency of the control signal.

4. A system in accordance with claim 1 wherein an intensity of the control signal is dependent on the charge current provided by said regulator means to said auxiliary battery.

5. A system in accordance with claim 1 wherein said auxiliary load comprises a heater element of a catalytic converter.

6. A system in accordance with claim 1 wherein an intensity of the control signal is provided to said regulator means, dependent on an amplitude of a terminal voltage.

7. A system for charging an auxiliary battery that drives an auxiliary load, said system comprising:

regulator means having a control input and an output, wherein the output is coupled to said auxiliary battery for providing a charge current variable dependent on a parameter of a control signal provided to the control input;

switch means for providing a coupling and a decoupling between said auxiliary battery and said auxiliary load, responsive to a command signal; and control means for providing the command signal that decouples said auxiliary battery from said auxiliary load via said switch means, and responsive thereto, for providing the control signal dependent on a voltage present across said regulator means.

8. A system in accordance with claim 7 wherein the parameter of the control signal is an amplitude of the control signal.

9. A system in accordance with claim 7 wherein the parameter of the control signal is a frequency of the control signal.

10. A system in accordance with claim 9 wherein an intensity of the control signal is dependent on the charge current provided by said regulator means to said auxiliary battery.

11. A system in accordance with claim 10 wherein said auxiliary load comprises a heater element of a catalytic converter.

12. A system in accordance with claim 7 wherein an intensity of the control signal is provided to said regulator means, dependent on an amplitude of a terminal voltage.

13. A system for charging an auxiliary battery that drives an auxiliary load, said system comprising:

a current regulator having a control input and an output, wherein the output is coupled to said auxiliary battery for providing a charge current variable dependent on an amplitude of a control signal provided to the control input;

a switch for providing a coupling and a decoupling between said auxiliary battery and said auxiliary load, responsive to a command signal; and a control device for providing the command signal that decouples said auxiliary battery from said auxiliary load via said switch, and responsive thereto, for providing the control signal, dependent on a voltage present across said current regulator.

14. A system in accordance with claim 13 wherein said control device comprises a charge pump circuit for increasing the variable charge current provided by said current regulator to said auxiliary battery, dependent on a decreasing voltage present across said current regulator.

15. A system in accordance with claim 14 wherein said control device comprises a charge sink circuit for decreasing the variable charge current provided by said current regulator to said auxiliary battery, dependent on an increasing voltage present across said current regulator.

16. A system in accordance with claim 15 wherein said current regulator comprises a first transistor, and wherein an intrinsic capacitance of said first transistor acts to maintain the variable charge current provided by said current regulator to said auxiliary battery.

17. A system in accordance with claim 16 wherein said current regulator comprises a second transistor, wherein said second transistor has an intrinsic diode coupled there across, and wherein the intrinsic diode is arranged to conduct the variable charge current.

18. A system in accordance with claim 13 wherein the control device comprises a circuit for increasing the variable charge current provided by the current regulator to the auxiliary battery dependent on a decreasing voltage present across the current regulator.

19. A method for charging an auxiliary battery that drives an auxiliary load, said method comprising the steps of:

decoupling said auxiliary battery from said auxiliary load; and then providing a variable charge current to said auxiliary battery wherein an amplitude of the variable charge current is dependent on a difference in terminal voltage across a current regulator that provides the variable charge current and said auxiliary load.

20. A method in accordance with claim 19 wherein the amplitude of the variable charge current is dependent on a frequency of a control signal.

21. A method in accordance with claim 20 wherein said step of providing comprises increasing the variable charge current provided by said current regulator to said auxiliary battery, dependent on a decrease in terminal voltage present across said current regulator.

22. A method in accordance with claim 21 wherein an intensity of the control signal is provided to said regulator means, dependent on an amplitude of a terminal voltage.

23. A method in accordance with claim 19 wherein the amplitude of the variable charge current is dependent on a period of a control signal.

24. A system for charging an auxiliary battery that drives an auxiliary load, the system comprising:

a primary battery;

a regulator coupled between the primary battery and the auxiliary battery for providing a charge current from the primary battery to the auxiliary battery, wherein the charge current is variable dependent on a control signal; and a control device for decoupling the auxiliary battery from the auxiliary load, and then for providing the control signal dependent on a power dissipation of the regulator.

25. A system for charging an auxiliary battery that drives an auxiliary load, the system comprising:

a primary battery;

a regulator coupled between the primary battery and the auxiliary battery for providing a charge current from the primary battery to the auxiliary battery, wherein the charge current is variable dependent on a control signal; and a control device for decoupling the auxiliary battery from the auxiliary load, and then for providing the control signal dependent on a voltage difference between the primary battery and the auxiliary battery.

26. A system in accordance with claim 7 wherein the amplitude of the variable charge current is dependent on a period of a control signal.

* * * * *